US008382883B2

(12) United States Patent
Yeager et al.

(10) Patent No.: US 8,382,883 B2
(45) Date of Patent: Feb. 26, 2013

(54) MEMBRANES COMPRISING AMINO ACID MOBILE CARRIERS

(75) Inventors: Gary William Yeager, Rexford, NY (US); Eric James Pressman, East Greenbush, NY (US); Scott Michael Miller, Clifton Park, NY (US); Cathryn Olsen, Gansevoort, NY (US)

(73) Assignee: General Electric Company, Niskayuna, NY (US)

( * ) Notice: Subject to any disclaimer, the term of this patent is extended or adjusted under 35 U.S.C. 154(b) by 1011 days.

(21) Appl. No.: 12/394,555

(22) Filed: Feb. 27, 2009

(65) Prior Publication Data

US 2010/0218680 A1    Sep. 2, 2010

(51) Int. Cl.
    *B01D 53/22*     (2006.01)
    *C08K 5/09*      (2006.01)
    *C08K 5/10*      (2006.01)
    *C07F 9/90*      (2006.01)
    *C08F 8/00*      (2006.01)
    *C08G 63/48*     (2006.01)
    *C08G 63/91*     (2006.01)

(52) U.S. Cl. ............... 96/14; 96/13; 524/300; 524/301; 525/61

(58) Field of Classification Search .................. None
    See application file for complete search history.

(56) References Cited

U.S. PATENT DOCUMENTS

| | | | |
|---|---|---|---|
| 5,611,843 A * | 3/1997 | Ho ..................................... 95/51 |
| 6,099,621 A * | 8/2000 | Ho .................................. 95/139 |
| 6,579,331 B1 | 6/2003 | Ho | |
| 7,011,694 B1 | 3/2006 | Ho | |
| 2002/0103305 A1 | 8/2002 | Ho | |
| 2008/0168900 A1 * | 7/2008 | Ho ..................................... 95/48 |

FOREIGN PATENT DOCUMENTS

| | | |
|---|---|---|
| CN | 1210750 A | 3/1999 |
| EP | 2027921 A2 | 2/2009 |
| WO | WO9703118 A1 | 1/1997 |
| WO | WO9841313 A1 | 9/1998 |
| WO | WO03062321 A1 | 7/2003 |
| WO | WO2006050531 A2 | 5/2006 |
| WO | WO2009058205 A1 | 5/2009 |

OTHER PUBLICATIONS

European Search Report dated Jun. 24, 2010.
Jian Zou, W.S. Winston Ho; CO2-selective polymeric membranes containing amines in crosslinked poly(vinyl alcohol); Journal of Membrane Science 286 (2006); pp. 310-321.

* cited by examiner

*Primary Examiner* — Duane Smith
*Assistant Examiner* — Pankti Patel
(74) *Attorney, Agent, or Firm* — Andrew J. Caruso

(57) ABSTRACT

In one aspect, the present invention provides a curable composition useful in the preparation of a gas separation membrane. The curable composition comprises a polyvinyl alcohol; an aliphatic polyamine; a polyglycidyl ether; and a salt of a $C_2$ to $C_4$ heterocyclic amino acid. In another aspect the present invention provides a composition comprising a crosslinked polyvinyl alcohol comprising structural units derived from a polyglycidyl ether, a polyamine and the salt of a $C_2$ to $C_4$ heterocyclic amino acid. The compositions are useful in the preparation of gas separation membranes in which the $C_2$ to $C_4$ heterocyclic amino acid in the form of its salt functions as a mobile carrier of carbon dioxide.

16 Claims, No Drawings

MEMBRANES COMPRISING AMINO ACID MOBILE CARRIERS

BACKGROUND

The invention relates to a curable composition comprising a polyvinyl alcohol and a salt of a heterocyclic amino acid Further, the present disclosure relates to an article made from a cured composition comprising a polyvinyl alcohol and a salt of an heterocyclic amino acid. In addition, the present disclosure relates to a method of making the cured composition and the article.

As energy costs rise, membrane technology for separating gases plays an important role in reducing the environmental impact and costs of industrial processes. Gas separation membranes offer a number of benefits over other gas separation technologies. Conventional technologies such as the cryogenic distillation of air, condensation to remove condensable organic vapors from gas mixtures, and amine absorption to remove acid gases such as carbon dioxide from natural gas require a gas-to-liquid phase change in the gas mixture that is to be separated. The phase change adds a significant energy cost to the separation cost. Membrane gas separation, on the other hand, does not require such a phase change.

In addition, gas separation membrane units are smaller than other types of plants, like amine stripping plants, and therefore have relatively small footprints. A small footprint is important in environments such as offshore gas-processing platforms. The lack of mechanical complexity in membrane systems is another advantage.

Currently, gas separation membranes are widely used in industry for hydrogen separation, for example, hydrogen/nitrogen separation in ammonia plants and hydrogen/hydrocarbon separations in petrochemical applications. Other industrial gas separation techniques include separating nitrogen from air; $CO_2$ and water removal from natural gas; and the removal of organic vapors from air and/or nitrogen streams. The most widely used membrane materials for gas separation are polymeric materials, which are especially useful as membranes because of their relatively low cost and ease of processing.

The efficiency of a gas separation membrane process is largely determined by the transport properties of the membrane such as permeability and selectivity for a specific gas in a mixture. Ideally, membranes should exhibit high selectivity and high permeability. For most membranes, however, selectivity and permeability are inversely related. Thus as selectivity increases, permeability decreases, and vice versa.

Rigid polymeric materials may be used for membranes capable of $CO_2$ removal from natural gas streams and in certain instances have shown high selectivity due to a high $CO_2$ diffusive selectivity. A key limitation of many such membranes is that, in the presence of high partial pressures of $CO_2$ or higher hydrocarbon contaminants, the separation properties of the membrane can deteriorate to levels that are not useful. In addition, higher aliphatic hydrocarbons and aromatic hydrocarbons, which are present in small amounts in natural gas, are highly soluble in the polymeric membrane materials employed and can concentrate in and plasticize the polymeric membrane material thereby reducing the diffusive selectivity of the membrane. Because membrane separation properties may be affected negatively by the presence of relatively low levels of impurities in the principal gases undergoing the gas separation process, rigorous and expensive pretreatments may be required.

Therefore, further improvements in membrane performance and properties of gas separation membranes and the corresponding polymeric compositions comprising them are needed. In particular, further improvements are needed to provide polymer compositions which are readily configured as membranes, and which exhibit good performance stability under gas separation conditions, and which exhibit high selectivity for and high permeability to one or more industrially relevant gases. The present invention provides additional solutions to these and other challenges associated with gas separations.

BRIEF DESCRIPTION

In one aspect, the present invention provides a curable composition comprising a polyvinyl alcohol; an aliphatic polyamine; a polyglycidyl ether; and a salt of a $C_2$ to $C_4$ heterocyclic amino acid.

In another aspect, the present invention provides a cured composition comprising structural units derived from a polyvinyl alcohol; an aliphatic polyamine; structural units derived from a polyglycidyl ether; and a salt of a $C_2$ to $C_4$ heterocyclic amino acid.

In yet another aspect, the present invention provides a cured composition comprising structural units derived from a polyvinyl alcohol; a polyallyl amine; structural units derived from ethylene glycol digycidyl ether; and a salt of proline.

These and other features, aspects, and advantages of the present invention may be understood more readily by reference to the following detailed description.

DETAILED DESCRIPTION

In the following specification and the claims, which follow, reference will be made to a number of terms, which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "solvent" can refer to a single solvent or a mixture of solvents.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As noted, in one embodiment the present invention provides a cured composition comprising structural units derived from a polyvinyl alcohol; an aliphatic polyamine; structural units derived from a polyglycidyl ether; and a salt of a $C_2$-$C_4$ heterocyclic amino acid.

In one embodiment, the polyvinyl alcohol has a weight average molecular weight in a range from about 1,000 grams/mole to about 2,000,000 grams/mole. In another embodiment, the polyvinyl alcohol has a weight average molecular weight in a range from about 30,000 grams/mole to about 200,000 grams/mole. In yet another embodiment, the polyvinyl alcohol has a weight average molecular weight in a range from about 50,000 grams/mole to about 175,000 grams/mole.

In one embodiment, the polyvinyl alcohol is present a range from about 10 weight percent to about 70 weight percent based on the total weight of the composition. In another embodiment, the polyvinyl alcohol is present a range from about 35 weight percent to about 50 weight percent based on the total weight of the composition.

In one embodiment, the polyvinyl alcohol can be a blend or copolymer of polyvinyl alcohol with other polymers. The term "copolymer" as used herein includes block copolymers, random copolymers and graft copolymers. Non-limiting examples of the polymers forming a blend or copolymer of the polyvinyl alcohol employed include vinyl polymers, polyalkylene oxides such as polyethylene oxide, acrylic polymers such as polyacrylamide, vinylamine and the like. Examples of vinyl polymers and copolymers include but are not limited to polyvinylamine, polyallylamine, polydiallylamine, polymethyldiallylamine, polydimethyldiallylamine, polymethylallylamine, polyvinylacetamide, polyvinylacetate, poly-3-vinylaniline, poly-4-vinylaniline, poly-3-vinylbenzoic acid, poly-4-vinylbenzoic acid, poly-vinylboronic acid pinacol ester, polyvinylboronic dialkylester, polyvinylcaprolactam, polyvinycyclohexanol, polyvinylcyclohexane oxide, poly-2-vinyl-1,3-dioxolane, poly-4-vinyl-1,3-dioxolane, polyvinylene carbonate, polyvinylene thiocarbonate, polyvinylene dithiocarbonate, polyvinylene trithiocarbonate, poly-N-vinylformamide, poly-1-vinylimidazole, polyvinylisocyanate, poly-2-propenylisocyanate, poly-vinyloxirane, poly-vinylphenylboronic acid, poly-vinylphosphonic acid, poly-1-vinyl-2-pyrroliddone, polyvinylsulfonic acid, polyvinylbenzaldehyde, polyvinyloxazoline, and hydrolysis products derived from one or more of the foregoing polymers.

The curable composition provided by the present invention comprises an aliphatic polyamine, which can function as a fixed carrier in $CO_2$ transport across a membrane comprising the formulation in its cured form. In one embodiment, the polyamine comprises a secondary amine group. Polyamines can include aminoglycans such as hylaronate, chondroitin, chondroitin-4-sulfate, chondroitin-6-sulfate, dermatan, dermatan sulfate, chitin, chitosan, murien, N-acetyllactosamine, chitobiose, keratan, keratan sulfate, heparin, heparan sulfate and the like. Non-limiting examples of the polyamine include polyvinylamine; polyallylamines such as polydiallylamine, polydimethyldiallylamine, polytriallylamine, and polymethylallylamine; polyvinylformamide; and polyvinylacetamide. In one embodiment, the polyamine comprises at least one material selected from the group consisting of polyallylamine, polyvinylamine, polydiallylamine, poly(vinylamine-co-vinylalcohol), polyethyleneimine, and poly(ethyleneimine-co-ethylene oxide). In one embodiment, the polyamine is a polyallylamine.

In one embodiment, the polyamine is present a range from about 1 weight percent to about 50 weight percent based on the total weight of the composition. In another embodiment, the polyamine is present a range from about 5 weight percent to about 20 weight percent based on the total weight of the composition.

The curable composition provided by the present invention comprises a polyglycidyl ether. In one embodiment, the polyglycidyl ether comprises at least one component selected from the group consisting of glycerol diglycidyl ether, glycerol triglycidyl ether, trimethylolpropane triglycidyl ether, trimethylolpropane diglycidyl ether, ethylene glycol diglycidyl ether, bisphenol-A diglycidyl ether, diethylene glycol diglycidyl ether, triethylene glycol diglycidyl ether, and propane diol diglycidyl ether. In one embodiment, the polyglycidyl ether is a diglycidyl ether. In yet another embodiment, the diglycidyl ether is an ethylene glycol diglycidyl ether.

In one embodiment, the polyglycidyl ether is present a range from about 5 weight percent to about 40 weight percent based on the total weight of the composition. In another embodiment, the polyglycidyl ether is present a range from about 10 weight percent to about 20 weight percent based on the total weight of the composition.

In cured compositions provided by the present invention the polyvinyl alcohol is cross-linked by the polyglycidyl ether. In such embodiments, the cross-linked polyvinyl alcohol comprises structural units derived from the polyglycidyl ether.

As noted, the curable compositions provided by the present invention comprises a salt of a $C_2$ to $C_4$ heterocyclic amino acid. In another embodiment, the salt of a heterocyclic amino acid comprises at least one metal cation selected from the group consisting of lithium, potassium, sodium, calcium, and magnesium. In yet another embodiment, the metal cation comprises potassium.

Non-limiting examples of the $C_2$ to $C_4$ heterocyclic amino acid include L-proline, D-proline, racemic-proline, 2-pyrrole carboxylic acid, 2-pyrrolidine carboxylic acid, 3-pyrrolidine carboxylic acid, 2-azetidine carboxylic acid, 3-azetidine carboxylic acid, 2-aziridine carboxylic acid. In one embodiment, the salt of the $C_2$ to $C_4$ heterocyclic amino acid is the L-proline.

In one embodiment, the salt of the heterocyclic amino acid is present a range from about 10 weight percent to about 50 weight percent based on the total weight of the composition. In another embodiment, the salt of the heterocyclic amino acid is present a range from about 15 weight percent to about 30 weight percent based on the total weight of the composition.

In one embodiment, a curable composition is substantially free of formaldehyde or formaldehyde equivalents. The term "formaldehyde equivalents" refers to compounds readily converted into formaldehyde such as dimethoxymethane, diacetoxymethane, dioxolane, and the like, and products of formaldehyde with polyamine, such as polyaminals.

In another embodiment, a cured composition comprising a cross-linked polyvinyl alcohol; an aliphatic polyamine; structural units derived from a polyglycidyl ether; and a salt of a heterocyclic amino acid is provided. The experimental section herein provides ample guidance on the preparation of cured compositions of the present invention. Those of ordinary skill in the art will understand that the embodiments illustrated in the experimental section herein disclose cross-linking of the polyvinyl alcohol component with a polyglycidyl ether prior to formulation of the crosslinked polyvinyl alcohol with other components of the membrane, the aliphatic polyamine and the salt of a salt of a $C_2$ to $C_4$ heterocyclic amino acid. The curable compositions provided herein represent variations in which the polyvinyl alcohol is not crosslinked with a polyglycidyl ether prior to its formulation with the aliphatic polyamine, the polyglycidyl ether, and the salt of a $C_2$ to $C_4$ heterocyclic amino acid. These "curable compositions" comprise one or more reactive groups on the polyvinyl alcohol and/or the aliphatic polyamine which reacts with the polyglycidyl ether when the uncured formulation is exposed to one or more of thermal energy, electromagnetic radiation, or a chemical curing reagents.

In one embodiment, an article made from a cured composition comprising a crosslinked polyvinyl alcohol; an aliphatic polyamine; structural units derived from a polyglycidyl ether; and a salt of a heterocyclic amino acid is provided.

In one embodiment, the article is a membrane. The membranes of the present invention can be fabricated to any desired shape, such as hollow fibers, tubes, films, sheets and the like, in accordance with the desired use. The membranes can be made by known techniques for fabricating membranes, such as knife casting, dip casting, or the like.

In one embodiment, the membrane of the present invention can be used as a gas separation membrane. In another embodiment, the membrane of the present invention is disposed as a film on a porous support. Porous supports include but are not limited to glass, ceramics, and porous organic polymers such as porous polyethersulfone and porous polytetrafluoroethylene. Examples of suitable porous organic polymers which may be used as a porous support include polysulfone, polyethersulfone, polybenzonitriles, polyamidesulfones, polyamidebenzonitriles, polythioethersulfone, polybenzimidazole, polyimide, polyamideimide, polyetherimide, polyphenylene, poly(phenylene oxide), polyvinylidene difluoride, polytetrafluoroethylene, poly(ethylene-co-tetrafluoroethylene), poly(tetrafluoroethylene-co-isopropylvinyl ether), polyacrylonitrile, polysaccharides, cellulose and cellulosic esters and ethers. In one embodiment, the present invention provides a membrane comprising a cured composition of the present invention disposed on a porous polytetrafluoroethylene support.

In one embodiment, the cured composition of the present invention can be used as a nonporous membrane for separating carbon dioxide from a carbon dioxide-containing gas stream. For example, carbon dioxide is removed from a gaseous feed stream by contacting the stream against one side, a first side, of the membrane and by withdrawing at the obverse side of the membrane a permeate comprising a carbon dioxide-enriched stream. In one embodiment, the membranes of the present invention are highly selective for carbon dioxide. In one embodiment, the membrane has a carbon dioxide selectivity of at least about 75, a carbon dioxide permeability of at least about 6000 GPU, and is thermally stable at in a temperature range from ambient temperature to about 200° C.

EXAMPLES

The following examples illustrate methods and embodiments in accordance with the invention. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif., and the like.

Preparation of an Aqueous Solution of Polyvinylalcohol and Ethylene Glycol diglycidyl Ether (PVA/EGDGE)

Polyvinylalcohol powder (CELVOL®, Mw=89-98K, 8.35 gram) was added to 0.190 moles of KOH followed by addition of about 45.6 gram of water in a 250 milliliter 3-necked round-bottomed flask equipped with mechanical stirrer and cold water condenser carrying a nitrogen bubbler. The mixture was heated until the polyvinyl alcohol had dissolved. Ethylene glycol diglycidyl ether (EDGE, 6.42 g, 0.03686 moles) was added at about 80° C. while the solution was stirred mechanically. The resultant mixture was heated at 80° C. under continuous stirring for about 16-24 hours under nitrogen.

Preparation of an Aqueous Solution of Polyvinylalcohol and Formaldehyde (PVA/KOH/CH$_2$O)

Polyvinylalcohol powder (CELVOL®, Mw=89-98K, 7.34 gram) and 44.8 grams of water were charged to a 250 mL 3-necked round-bottomed flask equipped with mechanical stirrer and cold water condenser, and nitrogen inlet. The solution was heated to dissolution at about 80° C. with mechanical stirring. To the above solution were added potassium hydroxide pellets (4.05 gram, 0.072 moles) and a 37% formaldehyde solution (6.83 gram of CH$_2$O, 0.084 moles). The solution was heated with continuous stirring at about 80° C. for a period of 16-24 hours under nitrogen.

Preparation of Amino Acid-Potassium Salt Solution

1-Proline (3.412 gram, 0.0296 moles) and 6.48 gram of water were added to a 4 gram (15 mL) vial containing magnetic stir bar. Potassium hydroxide (1.959 gram, 0.0349 moles) was added and the stirring continued until dissolution.

Preparation of Polyallylamine Solution

Polyallylamine hydrochloride (Mw=60K, 3.424 gram, 0.0370 moles polymer repeat unit, MW=92.65 gram/mole) along with 2.89 gram of KOH was dissolved in 64.98 gram of methanol and stirred overnight at room temperature. The solution was filtered to remove precipitated by-product KCl. The solvent was removed in vacuo on a rotary evaporator to afford 1.86 gram of polyallylamine. The polyallylamine was then dissolved in 19.25 gram of water.

Examples 1-5

Preparation of a Mixture of Amino Acid-Potassium Salt Solution and Aqueous PVA/EGDGE Solution The Solution of the amino acid-potassium salt was added over a period of about 1 minute to a solution of PVA/EGDGE (PVA crosslinked with EDGE) under mechanical stirring while maintaining the temperature at about 80° C. The vial containing the amino acid-potassium salt solution was rinsed with 2 grams of water and the rinses were also added to produce an aqueous PVA/EGDGE/amino acid-potassium salt solution.

Preparation of a Mixture of Aqueous Polyallylamine—PVA/EGDGE/Amino Acid-Potassium Salt Solution The polyallylamine solution as prepared above was added the aqueous PVA/EGDGE/amino acid-potassium salt solution over a time period of about 1 minute under mechanical stirring. The flask containing the polyallylamine solution was rinsed with 5 grams of water and the rinses were also added. The resultant solution was stirred for an additional 10 minutes at a temperature of about 80° C. to produce an aqueous coating formulation comprising polyallylamine, polyvinyl alcohol crosslinked with ethylene glycol diglycidyl ether (PVA/EGDGE) and the amino acid-potassium salt.

Membrane Casting Procedure A

The solution comprising aqueous polyallylamine—PVA/EGDGE-amino acid-potassium salt solution (Examples 1-5) was centrifuged at around 3100 rotations per minute for about 10 minutes while cooling. The centrifuged solution was cast onto an expanded polytetrafluoroethylene (ePTFE) support at 0.8 inches per second using a casting knife to form a cast membrane. The cast membrane was dried at room temperature for about 18 hours to remove most of the water. At the end of the stipulated time the dried cast membrane was heated in a muffle furnace at a temperature of about 120° C. for a period of about 6 hours.

Membrane Casting Procedure B

The solution comprising aqueous polyallylamine—PVA/EGDGE-amino acid-potassium salt solution (Examples 1-5) was centrifuged at around 3100 rotations per minute for about 10 minutes while cooling. The centrifuged solution was cast onto an ePTFE support at a rate of 0.8 inches per second using a casting knife to form a cast membrane. The cast membrane was dried at room temperature for about 18 hours to remove most of the water. At the end of the stipulated time the dried cast membrane was heated in a muffle furnace at a temperature of about 120° C. for a period of about 6 hours. About 12 parts of Snapsil RTV230A/B (Momentive Performance Materials, Waterford, N.Y. USA) was dissolved in about 20 parts hexane and cast onto a 1 mil thickness as a coating layer on the surface of the membrane using a doctor blade. The coating layer was allowed to cure at room temperature overnight prior to membrane testing and evaluation.

Performance Measurement Procedure

The membranes of Examples 1-5 were mounted independently in a test cell with an active membrane area of 8.7 centimeter square and pressurized on the feed side with a gas mixture comprising 5.01% $O_2$, 16.99% $CO_2$ and 79.0% $N_2$. The gas flow rate though the test cell was about 80 standard $cm^3$/minute. The permeate side of the membrane was swept with an argon gas stream at a flow rate of 80 standard $cm^3$/minute. Both feed and permeate were humidified by pumping deionized water into a 1 liter steel vessel, heated at 110° C., upstream of the test cell. The test cell and all gas lines were also heated to 110° C. Permeate gas composition was determined using a gas (Agilent 3000 Micro GC) by comparison of the integrated areas of the $CO_2$ and $N_2$ peaks. Membrane permeance, permeability, and selectivity were determined under a variety of conditions using the following equations. Test results are given in Table 1.

$$\text{Flux } CO_2 = \frac{\Delta PCO2(\text{Feed} - \text{Sweep}) - \Delta PCO2(\text{retentate} - \text{permeate})}{\ln \frac{(\Delta PCO2(\text{feed} - \text{sweep}))}{(\Delta PCO2(\text{retentate} - \text{permeate})}}$$

where:

$$\Delta Py(\text{feed} - \text{sweep}) = ([\text{Feed gas pressure (bar)} \times \text{Wet feed component } y \text{ concentration}] - [\text{Sweep gas pressure (bar)} \times \text{Wet sweep component } y \text{ concentration}])$$

$$\text{Wet gas component } y \text{ concentration (\%)} = \frac{\text{Dry gas } y \text{ feed } conc. \% \times \text{Dry feed gas flow rate } (sccm)}{H_2O \text{ flow rate } (sccm) + \text{Dry feed gas flow rate } (sccm)}$$

$$sccm\ H_2O = \frac{H_2O \text{ flow rate (mL/min)} \times 2.48 \times 10^{-2} \text{ m}^3/\text{mol } (STP) \times 1000000 \text{ cm}^3/\text{m}^3 \times 1 \text{ g/ml}}{H_2O \text{ molecular wt. (g/mol)}}$$

$$CO_2 \text{ Permeance} = \frac{(\% \ CO_2 \text{ in permeate stream}) \times \text{Dry } CO_2 \text{ sweep gas flow rate } (sccm)}{\text{Membrane area (cm}^2)/\text{Flux } CO_2}$$

$$\text{Permeability} = \text{Permeance } (y) \times \text{Membrane Thickness}$$

$$\text{Selectivity} = \frac{\text{Permeability}_{CO2}}{\text{Permeability}_{N2}}$$

Table 1 gives the composition of the membrane mounted on an ePTFE (QM102) support employing the Casting Method A as described above.

TABLE 1

| Sample | Carrier* | Sol 1A (PVA/$H_2O$/KOH/$CH_2O^\#$) | Sol 1B (PVA/$H_2O$/EGDGE$) | Sol 2 (Carrier/$H_2O$/KOH) | Sol 3 (PAA/$H_2O$) | Sol 4 (Sol 1A or Sol 1B/$H_2O$) | Sol 5 (Sol 4/Sol 3/$H_2O$) | Coating Method |
|---|---|---|---|---|---|---|---|---|
| Ex. 1 | 2-Pyrrole Carboxylic acid | | 8.35/45.6/6.42 | 3.378/6.48/2.01 | 1.86/19.25 | 60.37/11.87/1.62 | 73.86/21.11/4.81 | A |
| Ex. 2 | 2-Pyrrole Carboxylic acid | | 8.35/45.6/6.42 | 3.378/6.48/2.01 | 1.86/19.25 | 60.37/11.87/1.62 | 73.86/21.11/4.81 | A |
| Ex. 3 | L-Proline | | 8.35/45.6/6.42 | 3.412/6.48/1.959 | 1.86/19.25 | 60.37/11.85/1.62 | 73.84/21.11/4.81 | A |
| Ex. 4 | L-Proline | | 8.35/45.6/6.42 | 3.412/6.48/1.959 | 1.86/19.25 | 60.37/11.85/1.62 | 73.84/21.11/4.81 | A |
| Ex. 5 | L-Proline | | 8.35/45.6/6.42 | 3.412/6.48/1.959 | 1.86/19.25 | 60.37/11.85/1.62 | 73.84/21.11/4.81 | A |

TABLE 2

| Sample | Dense Film Thickness (μm) | Feed Pressure (psi) | $H_2O$ Feed Flow Rate (ml/min) | $H_2O$ in Feed (volume %) | Sweep Pressure (psi) | $H_2O$ Sweep Flow Rate (ml/min) | $H_2O$ in Sweep (volume %) | Temperature (° C.) | $CO_2$ Permeance (GPU) | $CO_2$ Permeability (Barrer) | $CO_2/N_2$ Selectivity |
|---|---|---|---|---|---|---|---|---|---|---|---|
| 1 | 8.4 | 35 | 0.045 | 44 | 20.5 | 0.3 | 84 | 110 | 41 | 344 | 65.0 |
| 2 | 8.4 | 49.7 | 0.029 | 33 | 20.8 | 0.3 | 84 | 110 | 35 | 296 | 66.0 |
| 3 | 5.0 | 34.9 | 0.045 | 44 | 20.1 | 0.3 | 84 | 110 | 128 | 640 | 53.0 |
| 4 | 5.0 | 49.8 | 0.029 | 33 | 20.5 | 0.3 | 84 | 110 | 120 | 602 | 87.3 |
| 5 | 5.0 | 64.6 | 0.019 | 25 | 20.4 | 0.3 | 84 | 110 | 97.5 | 487 | 72.0 |

Table 2 gives the performance charactristics of membrane compositions mounted on an ePTFE (QM102) support employing the membrane test method described above.

The formulations used in the membranes of Examples 1-5 used ethylene glycol diglycidyl ether as the PVA crosslinking agent. These membranes exhibited outstanding performance of the small-ring heterocyclic amino acid mobile carriers (Table 2). Thus, the mobile carriers having four annular carbons (Example 1-Example 5) displayed excellent membrane properties. The present invention is advantageous as it provides membranes in which the use of smaller mobile carriers results in outstanding performance characteristics in a $CO_2$ separation membrane.

The foregoing examples are merely illustrative, serving to exemplify only some of the features of the invention. The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A curable composition comprising:
    a polyvinyl alcohol;
    an aliphatic polyamine;
    a polyglycidyl ether; and
    a salt of a $C_2$ to $C_4$ heterocyclic amino acid.

2. The composition according to claim 1, wherein the aliphatic polyamine is at least one selected from the group consisting of polyallylamine, polyvinylamine, polydiallylamine, poly(vinylamine-co-vinylalcohol), polyethyleneimine, and poly(ethyleneimine-co-ethylene oxide).

3. The composition according to claim 1, wherein the polyamine is polyallylamine.

4. The composition according to claim 1, wherein the polyglycidyl ether is at least one selected from the group consisting of glycerol diglycidyl ether, glycerol triglycidyl ether, trimethylolpropane triglycidyl ether, trimethylolpropane diglycidyl ether, ethylene glycol diglycidyl ether, bisphenol-A diglycidyl ether, diethylene glycol diglycildyl ether, triethylene glycol diglycidyl ether, and propane diol diglycidyl ether.

5. The composition according to claim 1, wherein the polyglycidyl ether is ethylene glycol diglycidyl ether.

6. The composition according to claim 1, wherein the salt of a heterocyclic amino acid comprises at least one metal cation is selected from the group consisting of lithium, sodium, potassium, calcium, and magnesium.

7. The composition according to claim 1, wherein the salt of a heterocyclic amino acid comprises potassium.

8. The composition according to claim 1, wherein the salt of a heterocyclic amino acid is a salt of proline.

9. The composition according to claim 1, which is free of formaldehyde or formaldehyde equivalents.

10. The composition according to claim 1, comprising:
    from about 10 weight percent to about 70 weight percent of the polyvinyl alcohol based on a total weight of the composition;
    from about 1 weight percent to about 50 weight percent of the polyamine based on a total weight of the composition;
    from about 5 weight percent to about 40 weight percent of the polyglycidyl ether based on a total weight of the composition; and
    from about 10 weight percent to about 50 weight percent of the salt of a heterocyclic amino acid based on a total weight of the composition.

11. The composition according to claim 1, comprising:
    from about 35 weight percent to about 50 weight percent of the polyvinyl alcohol based on a total weight of the composition;
    from about 5 weight percent to about 20 weight percent of the polyamine based on a total weight of the composition;
    from about 10 weight percent to about 20 weight percent of the polyglycidyl ether based on a total weight of the composition; and
    from about 15 weight percent to about 30 weight percent of the salt of a heterocyclic amino acid based on a total weight of the composition.

12. An article comprising the composition of claim 1.

13. A gas separation membrane precursor comprising the composition of claim 1 disposed as a film upon a porous support.

14. A curable composition comprising:
    a polyvinyl alcohol;
    a polyallylamine;
    ethylene glycol diglycidyl ether; and
    a salt of proline.

15. The composition according to claim 14, which is free of formaldehyde or formaldehyde equivalents.

16. The composition according to claim 15, wherein the salt of proline is present in an amount corresponding to from about 10 weight percent to about 50 weight percent based on a total weight of the composition.

* * * * *